Figure 5A:
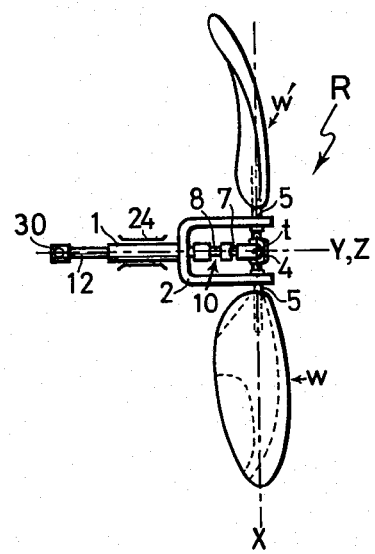

United States Patent [19]

Oguri

[11] 3,917,195

[45] Nov. 4, 1975

[54] VERTICAL/SHORT TAKE-OFF AND LANDING AIRCRAFT

[76] Inventor: Yoshiyuki Oguri, 9-7, 7-chome, Minami-Aoyama, Japan

[22] Filed: Dec. 5, 1973

[21] Appl. No.: 422,532

[52] U.S. Cl. .................................... 244/66; 416/112
[51] Int. Cl.² ........................................ B64C 27/52
[58] Field of Search .......................... 416/108–116, 416/98–100, 102–105, 79, 82, 83; 244/6, 7 A, 7 R, 12 R, 17.25, 17.11, 65, 66

[56] References Cited
UNITED STATES PATENTS

| | | | |
|---|---|---|---|
| 2,039,628 | 5/1936 | Brown | 416/112 |
| 2,954,943 | 10/1960 | De Lagabbe | 244/66 X |
| 2,966,317 | 12/1960 | Ramniceanu | 416/98 X |
| 3,035,644 | 5/1962 | Derschmidt | 416/102 |
| 3,080,002 | 3/1963 | Du Pont | 416/102 |

Primary Examiner—Trygve M. Blix
Assistant Examiner—Paul E. Sauberer

[57] ABSTRACT

Each of a pair of thrust axis deflecting propellers comprises a main rotary shaft and a blade shaft having blades mounted at its opposite ends, the blades being coupled to each other by means of a variable bent arm in such manner that the blade on the flap-down side may have a higher pitch while the other blade, on the flap-up side, may have a lower pitch through a periodic pitch variation in accordance with the rotation of the main shaft. The propellers are so mounted on an aircraft that said periodic pitch variation may be achieved symmetrically on the opposite sides of the aircraft axis, and thereby a transition flight between a vertical take-off and landing and an advancing flight may be carried out easily and safely by varying the bending angle of said variable bent arm.

3 Claims, 74 Drawing Figures

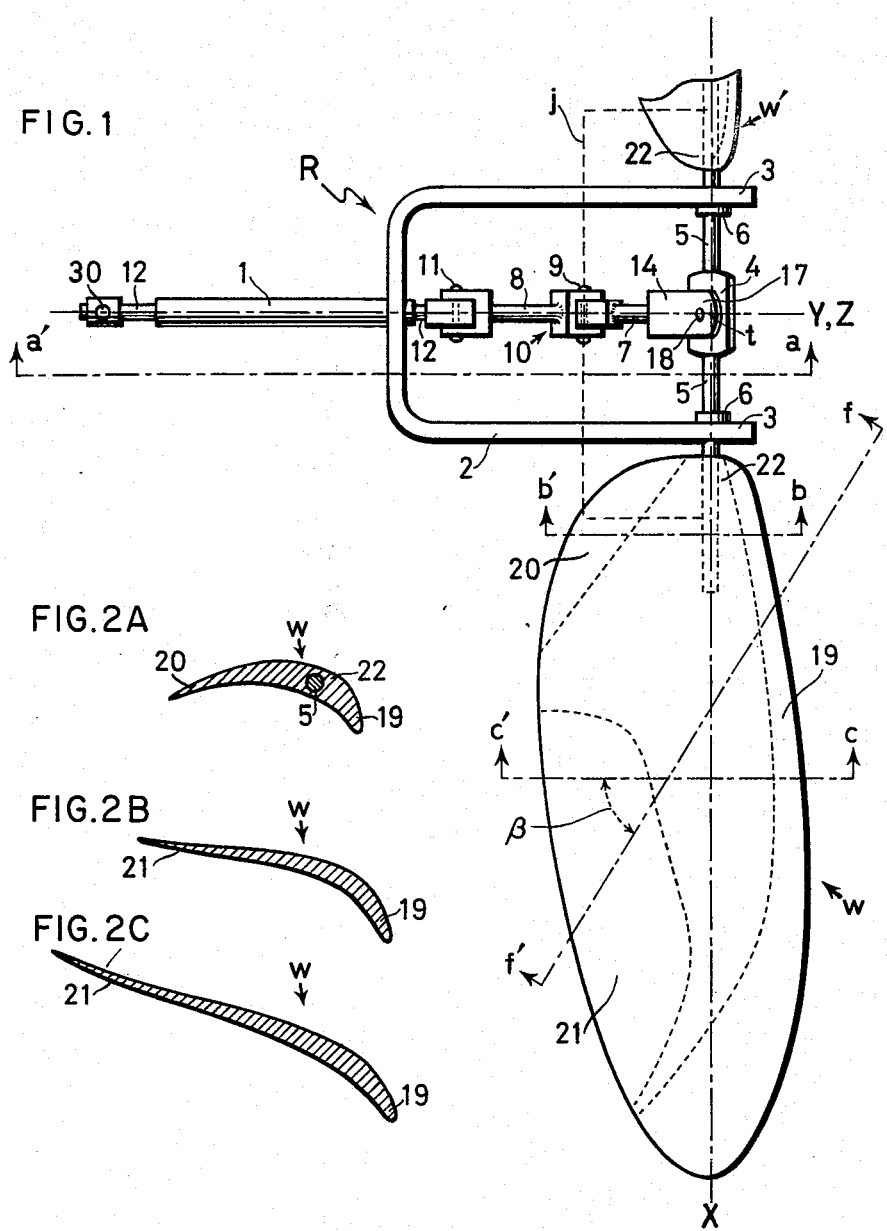
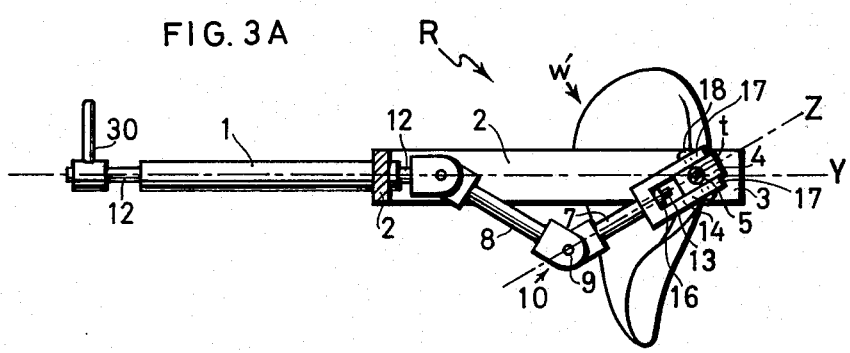

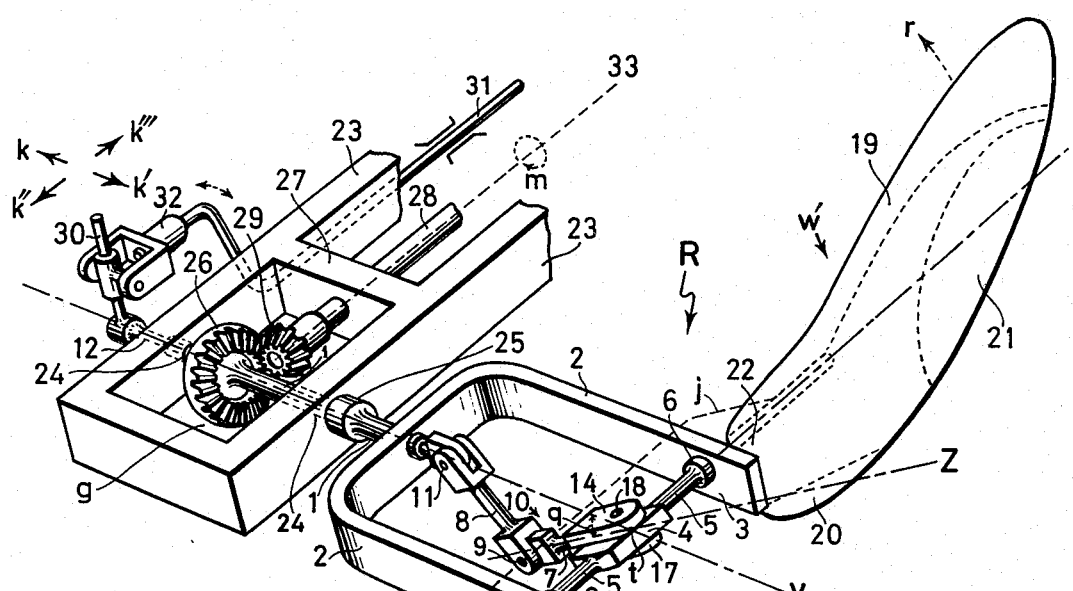
FIG. 4
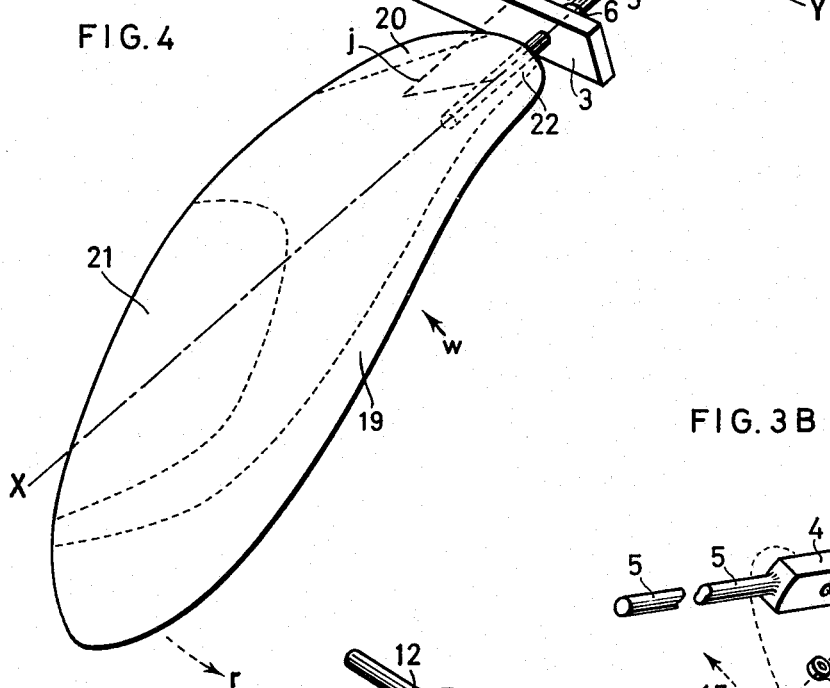
FIG. 3B
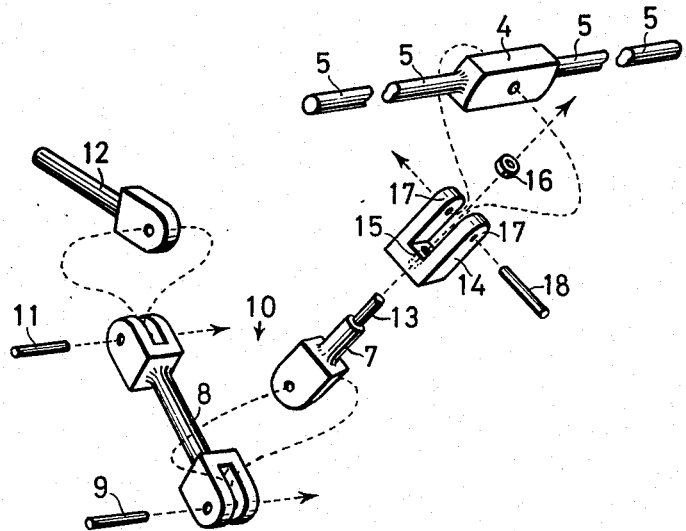

FIG. 7.1c 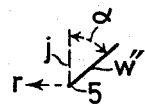
FIG. 7.1b
FIG. 7.1a 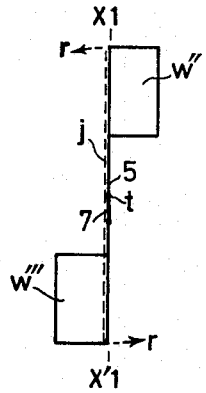
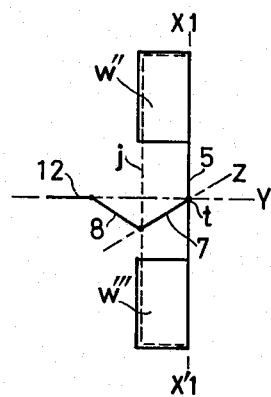
FIG. 7.1d 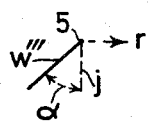
FIG. 7.2c 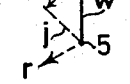
FIG. 7.2b
FIG. 7.2a 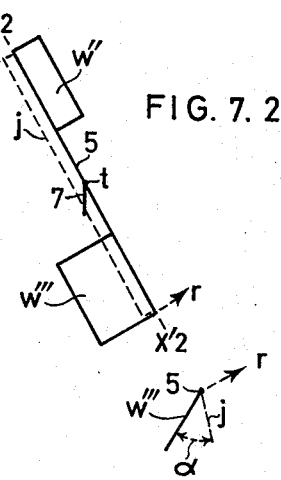
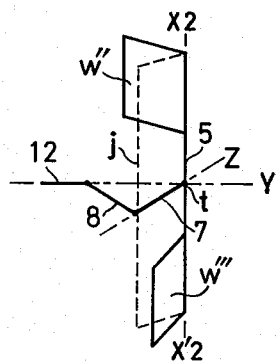
FIG. 7.2d 

FIG. 7. 3c
FIG. 7. 3a
FIG. 7. 3b
FIG. 7. 3d
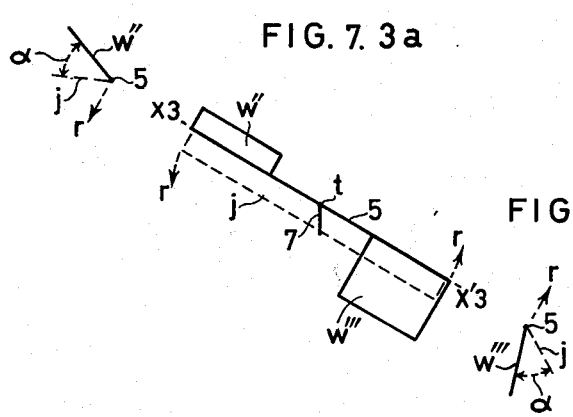
FIG. 7. 4c  FIG. 7. 4a  FIG. 7. 4d  FIG. 7. 4b
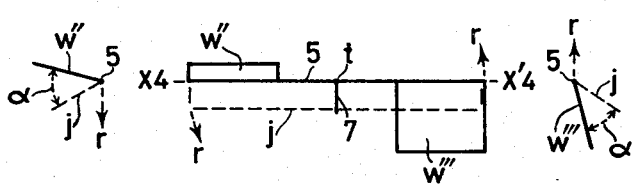

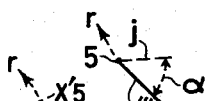
FIG. 7.5d
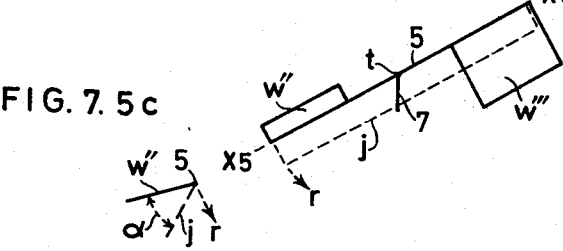
FIG. 7.5a
FIG. 7.5c
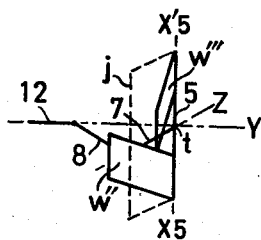
FIG. 7.5b
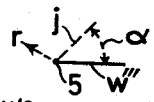
FIG. 7.6d
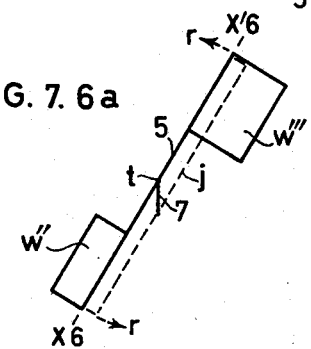
FIG. 7.6a
FIG. 7.6c
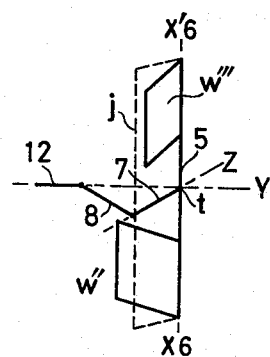
FIG. 7.6b
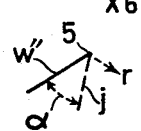

FIG. 8.A  FIG. 8.B
FIG. 8.A 2b 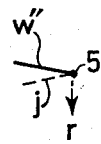   FIG. 8.B 6b 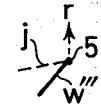
FIG. 8.A 3b    FIG. 8.B 5b 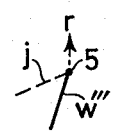
FIG. 8.A 4b    FIG. 8.B 4b 
FIG. 8.A 5b 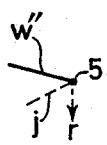   FIG. 8.B 3b 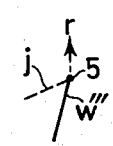
FIG. 8.A 6b 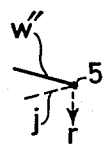   FIG. 8.B 2b 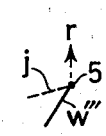

FIG. 9.A        FIG. 9.B
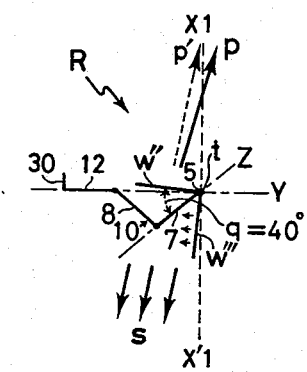 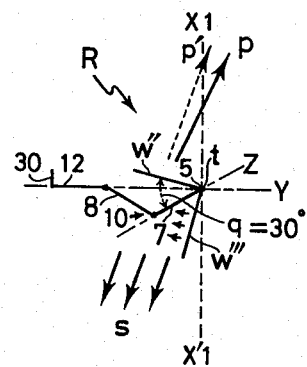
FIG. 9.C        FIG. 9.D        FIG. 9.E
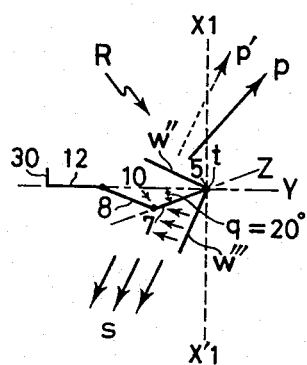 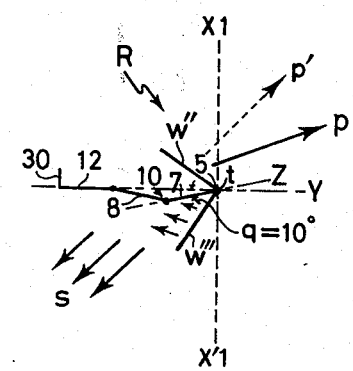 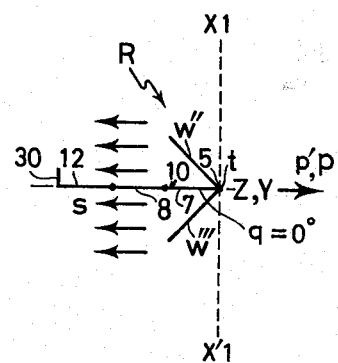

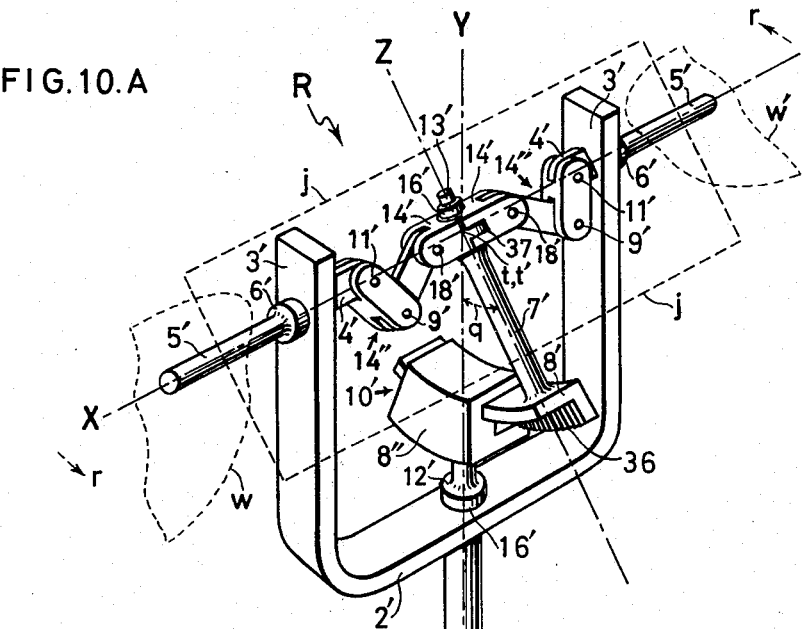
FIG.10.A
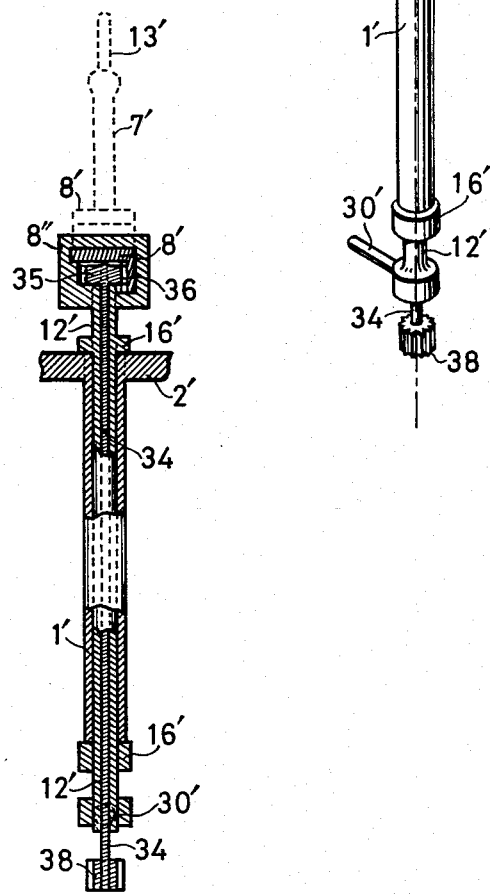
FIG.10.B
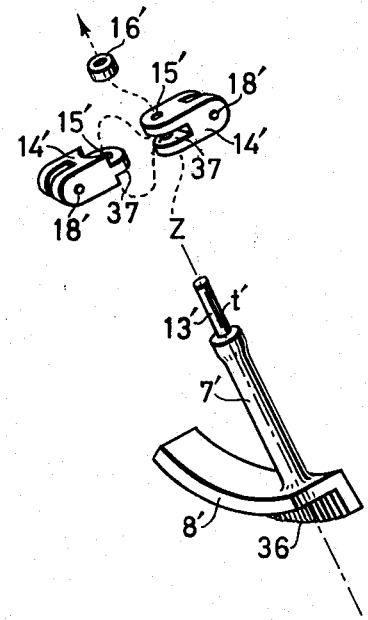
FIG.10.C1

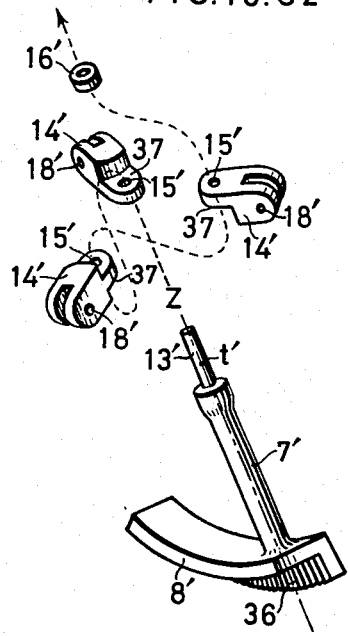
FIG.10.C2
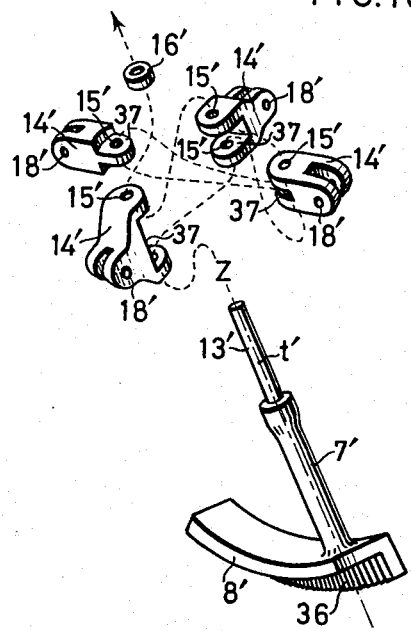
FIG.10.C3
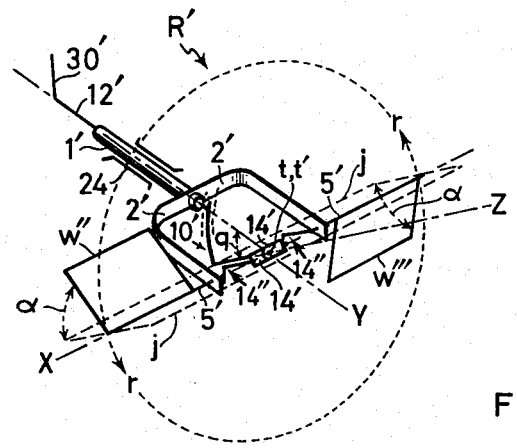
FIG.10.D
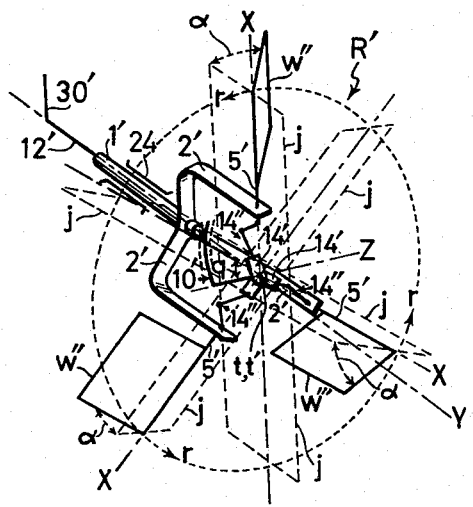
FIG.10.E
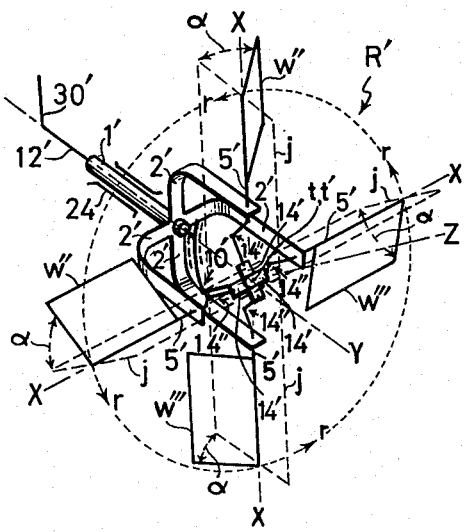
FIG.10.F

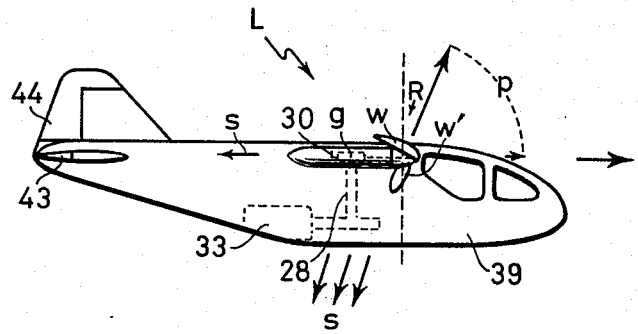
FIG. 11. A
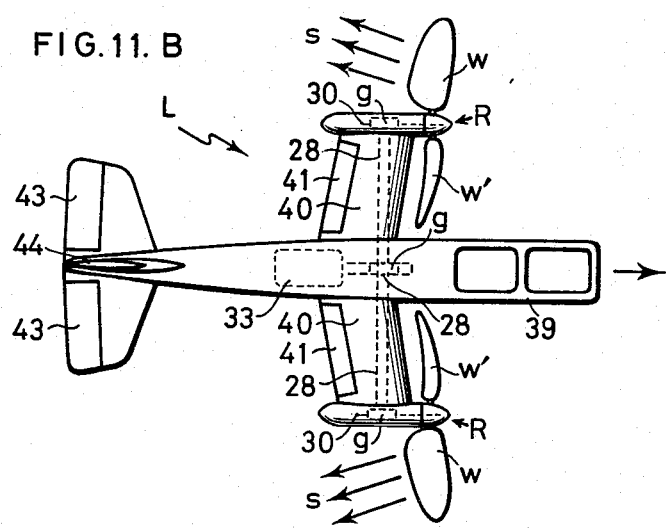
FIG. 11. B
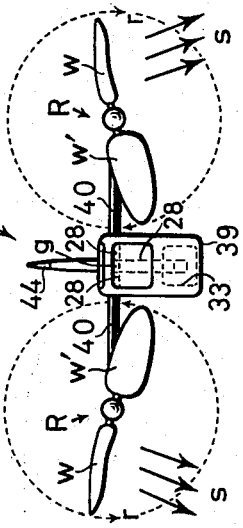
FIG. 11.C
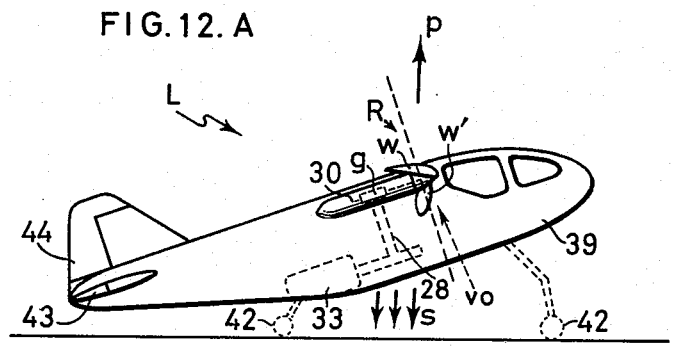
FIG. 12. A FIG.12.B
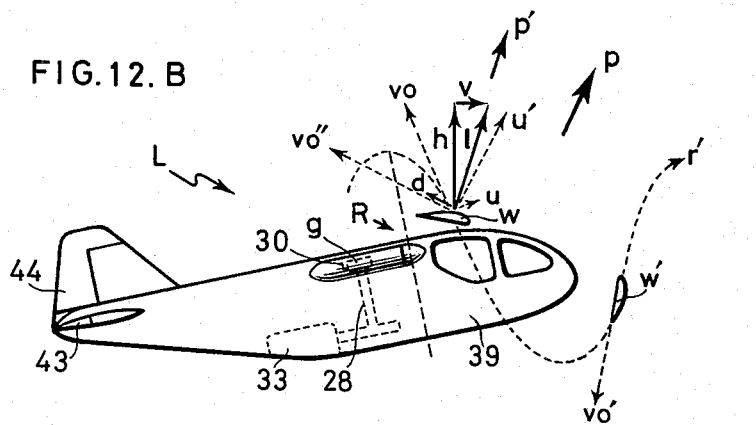
FIG.12.C
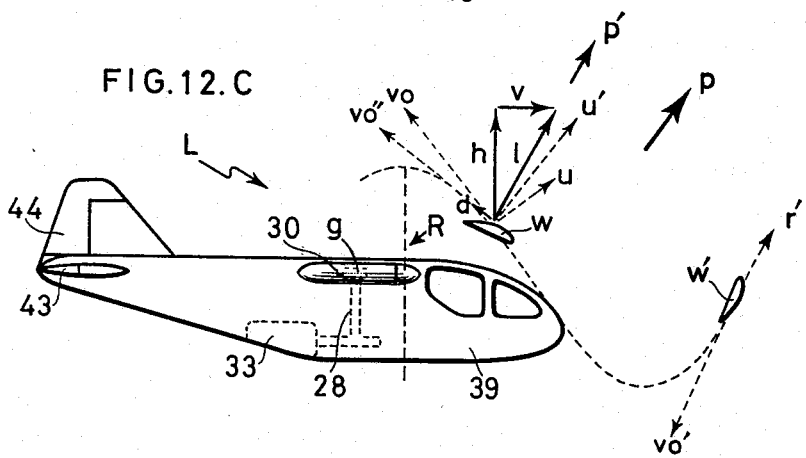
FIG.12.D
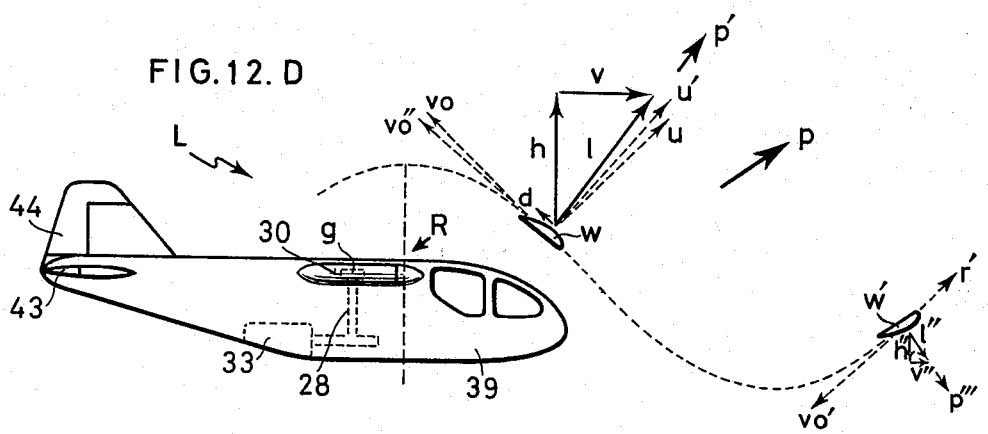
FIG.12.E1  FIG.12.E2
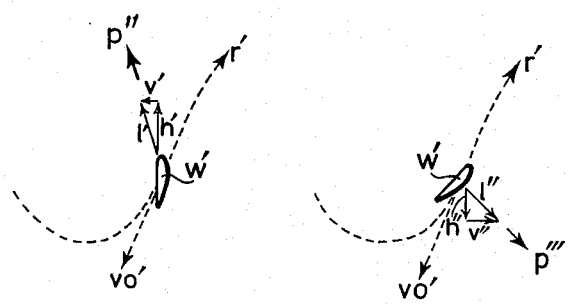

FIG.13. L1
FIG.13. L2
FIG.13. L3
FIG.13. L4
FIG.13. L5
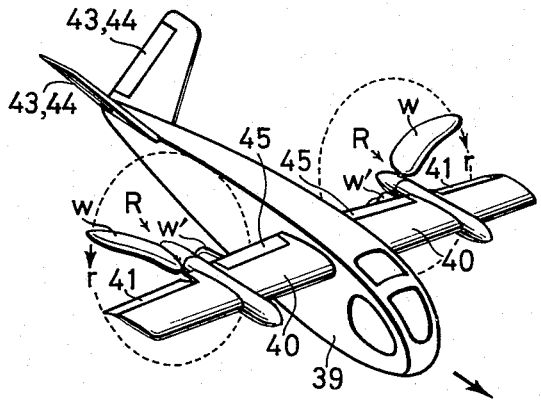
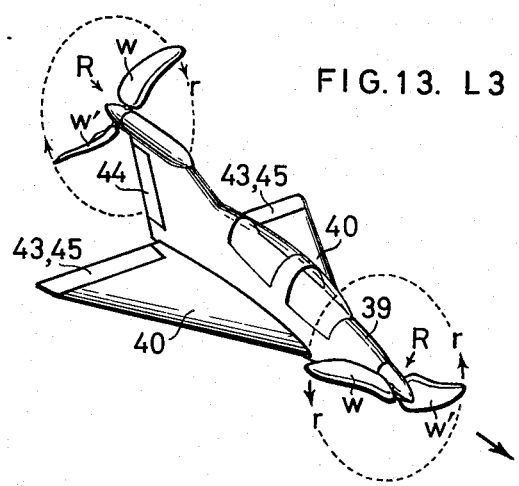
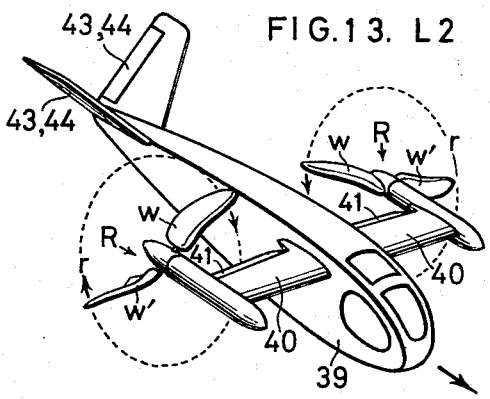
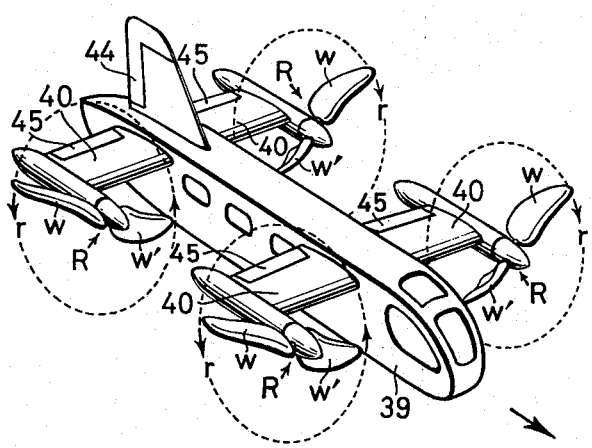
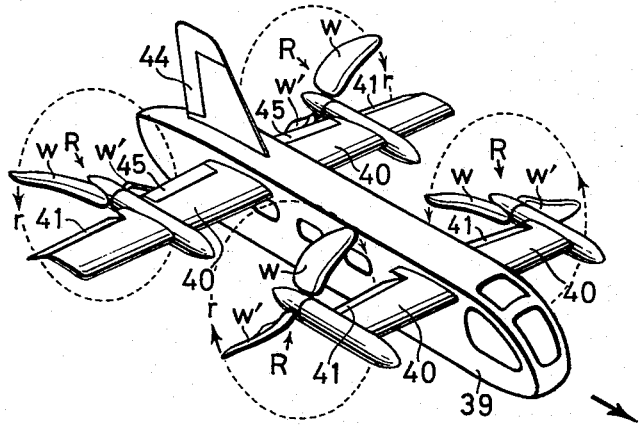

VERTICAL/SHORT TAKE-OFF AND LANDING AIRCRAFT

The present invention relates to a vertical/short take-off and landing aircraft (V/STOL).

The heretofore known VTOL of tilt-propeller type had a disadvantage in respect to the weight of the aircraft body because it required means for tilting the rotary plane of the propeller, and further it was inefficient and uneconomical because the lift generated by the main wings was not fully utilized during the transition flight. On the other hand, the known VTOL of tilt-wing type had a disadvantage in that since the main wings equipped with the rotary propellers were integrally tilted, the mechanisms were more complexed and the weight of the aircraft body was greatly increased; and further it had a problem in respect to safety upon take-off and landing, because during the transition flight, a main wing portion having a large angle of attack and which was outside of the slip stream of a propeller, was apt to stall. Finally, the known VTOL of deflected slip stream type had a disadvantage in that it was especially difficult to control because, in addition to the fact that there was a large reduction of the slip stream speed upon changing the direction of the slip stream by means of a flap, the conditions for flying safely were limited by the composite balancing of the speed, driving force, flap angle, angle of attack of the aircraft body, and the like.

Therefore, a principal object of the present invention is to provide an aircraft that is free from the aforementioned various disadvantages of the heretofore known propeller VTOLs.

Observing a flight by means of live wings, especially the flight of a sparrow, it will be appreciated that transition flight between the vertical take-off and landing and advancing flight is realized in a quite reasonable manner as a deflection of the slip stream of the flapping wings as well as of the thrust axis. It combines an operation in which the pitch of the wing on the flap-down side is made large and the pitch of the wing on the flap-up side is made small while the plane of flapping motion is maintained tilted forwardly at a steep angle of 70°–80° with respect to the axis of the body and while the angle of attack of the body is maintained substantially constant, and another operation in which the respective pitches are increased and decreased in an inversely proportional manner. Accordingly, in case of an aircraft, if a pair of thrust axis deflection propellers which are subjected to pitch variation in a symmetrical manner, are equipped on the opposite sides of the aircraft body in the forward direction, the downwardly moving blades being on the respective outsides of both rotary planes and being set at a higher pitch to simulate the flap-down wing of the sparrow, the upwardly moving blades on the respective insides being set at a lower pitch to simulate the flap-up wing of the sparrow, and if provision is made such that the respective pitches can be increased and decreased in an inversely proportional manner, then the respective thrust axis deflection propellers can freely deflect the propeller slip stream as well as the thrust axis without tilting their rotary planes (which are equivalent to the plane of flapping motion of the sparrow), and also similarly to the case of the flapping wings of sparrow, the transition flight can be realized in a reasonable manner with the driving force for the blades and the aerodynamic force being always matched to each other.

A second object of the present invention is to provide an aircraft of the type in which flight motion is realized by tilting the thrust axes on the opposite sides of the aircraft body similarly to the case of live wings.

A third object of the present invention is to provide an aircraft which can be easily piloted.

A fourth object of the present invention is to prevent a falling accident due to a stall which was inherently inevitable for heretofore known aircraft, by utilizing thrust axis deflection propellers which can always secure an upward aerodynamic force independently of forward speed, owing to an enormous difference between the air pressures exerted upon the upper and lower surfaces, respectively, of the blade on the flap-down side, which blade has a higher pitch.

A fifth object of the present invention is to achieve transition flight more reasonably than any VTOL in the prior art and in an absolutely safe manner, by making use of thrust axis deflection propellers which can secure the maximum aerodynamic force at the highest efficiency in relation to the advancing speed.

A sixth object of the present invention is to realize an abrupt deceleration or an abrupt stop during a high speed flight in a very reliable and absolutely safe manner, which was definitely impossible for aircraft in the prior art.

The feature of the present invention for achieving the aforementioned objects exists in a vertical/short take-off and landing aircraft equipped with a pair of thrust axis deflection propellers rotating in opposite directions and in such manner that a periodic pitch variation may be achieved symmetrically on the opposite sides of the aircraft axis; in which said thrust axis deflection propeller is constructed in such manner that a tubular main rotary shaft is fixedly secured to and extends through a base portion of a frame member, a blade shaft is pivotably supported at upper portions of said frame member, an elongated shaft having a bent arm at its upper portion is loosely fitted in the tube of the tubular main rotary shaft so as to be freely rotatable, a rotary arm having a center axis common to an upper tilting shaft of the bent arm is pivotably secured to a base portion of the blade shaft, and when the tubular main rotary shaft is rotated while the end of the elongated shaft is fixedly secured to an outside frame, the center axis of the upper tilting shaft or its extension may rock about the cross point between the blade shaft axis or its extension and the tubular main rotary shaft axis or its extension, always along a rocking plane which rocks in coincidence with the rocking motion of the blade shaft about its own axis, and that blades are mounted at the tip ends of said blade shaft.

The features and advantages of the present invention will become more apparent from the following description with reference to the accompanying drawings, in which:

FIG. 1 is a top plan view of a thrust axis deflection propeller to be utilized in the vertical/short take-off and landing aircraft according to the present invention.

Figure 5B:
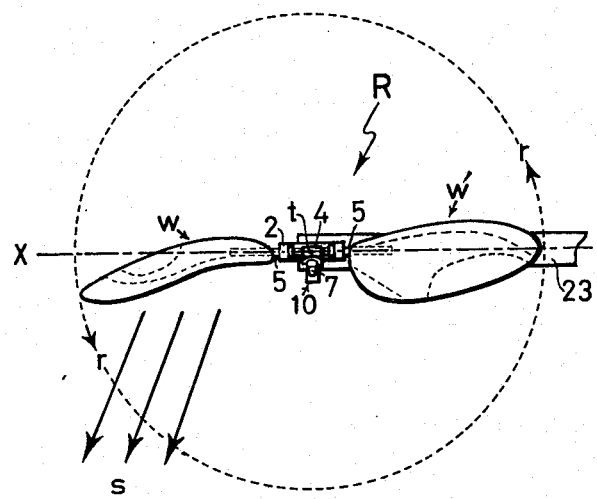
Figure 6A:
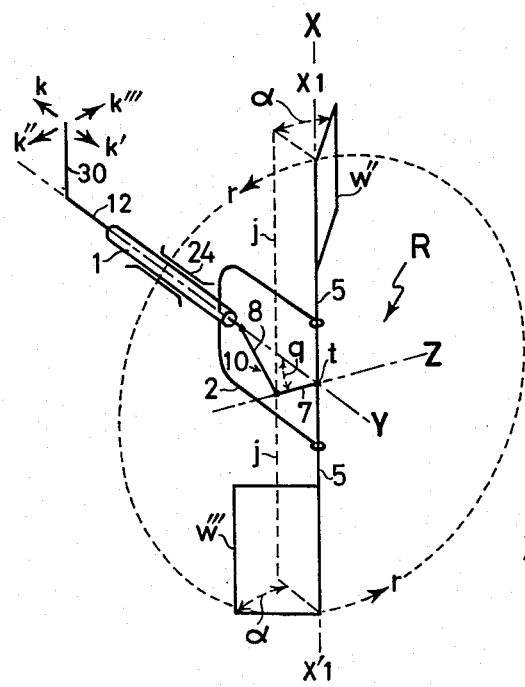
Figure 6B:
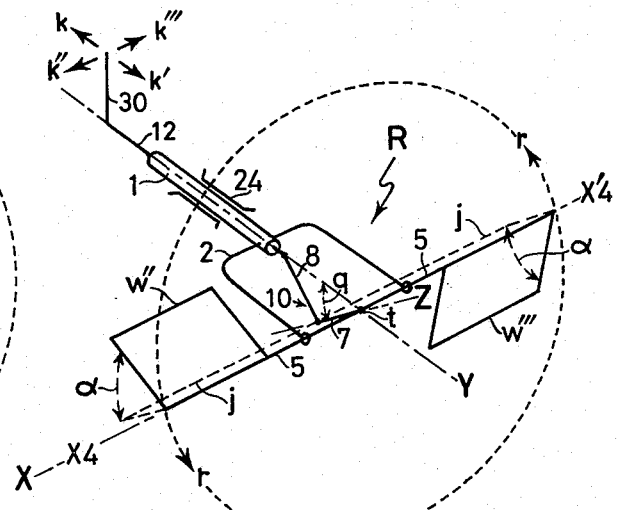

FIGS. 2A to 2C are cross-section views of the blade mounted in said thrust axis deflection propeller, FIG. 2A being a cross-section view taken along line b-b' in FIG. 1, FIG. 2B being a cross-section view taken along line c-c' in FIG. 1, and FIG. 2C being a cross-section view in an oblique direction taken along line f-f in FIG. 1, FIGS. 3A and 3B are schematic views showing the operating mechanism of the thrust axis deflection propeller illustrated in FIG. 1, FIG. 3A being a side view of the operating mechanism as viewed along line a-a' in FIG. 1, and FIG. 3B being an exploded view of said operating mechanism, FIG. 4 is a perspective view showing a complete assembly of the thrust axis deflection propeller, FIGS. 5A and 5B are basic operation views showing the periodic pitch variation of the thrust axis deflection propeller, FIG. 5A being a top plan view, and FIG. 5B being a front view, FIGS. 6A and 6B are diagrammatic views showing the basic principle of the periodic pitch variation of the thrust axis deflection propeller, FIGS. 7.1a to 7.1d, through FIGS. 7.6a to 7.6d are related diagramatic views for explaining the respective steps in the periodic pitch variation by means of rectangular blades, FIG. 8, consisting of FIGS. 8A and 8B, are diagrammatic views for comparing the respective steps in the periodic pitch variation of the rectangular blades as aligned in a vertical column, FIG. 9, consisting of FIGS. 9A to 9E, are diagrammatic views for explaining the basic aerodynamic effects of the thrust axis deflection propeller, FIGS. 10A to 10F are schematic views showing the structure of the thrust axis deflection propeller employing an alternative mechanism, FIG. 10A being a perspective view, FIG. 10B being a longitudinal cross-section view showing the inner structure of the tilting mechanism for a tilting shaft as well as the inner structure of the tubular main rotary shaft, FIGS. 10C1 to 10C3 being diagrammatic views for explaining the tilting mechanism portion of the tilting shaft and the articulated coupling between the rotary arm and the tilting shaft, and FIGS. 10D, 10E and 10F being schematic views for comparatively showing the mechanisms of the two-blade thrust axis deflection propeller and multi-blade (three-blade, four-blade) thrust axis deflection propellers, FIGS. 11A, 11B and 11C are three side views of the vertical/short take-off and landing aircraft according to the present invention, FIG. 11A being a left side view, FIG. 11B being a top plan view, and FIG. 11C being a front view, FIG. 12, consisting of FIGS. 12A to 12E, are schematic views showing the flight principle of the vertical/short take-off and landing aircraft according to the present invention, and FIG. 13, consisting of FIGS. 13L1 to 13L5, are perspective views showing various configurations of the vertical/short take-off and landing aircraft according to the present invention.

In the thrust axis deflection propeller R (hereinafter referred to simply as BIOPROP.R) to be utilized in the vertical/short take-off and landing aircraft (hereinafter referred to simply as the subject aircraft L), as shown in FIGS. 1 to 4, a tubular main rotary shaft 1 extends through and is fixedly secured to the center of a base portion of a frame member 2 extending from opposite ends of the base portion, and projecting in one direction parallel to the shaft 1 (forwardly, as shown) are the respective arms 3, 3 of said frame member 2, which pivotably support a blade shaft 5 that has a thick plate portion at its center axial motion of the shaft 5 relative to the frame is prevented by means of retaining rings 6, 6 which hold the blade shaft precisely at such position that the center axis of the blade shaft or its extension (hereinafter referred to simply as X-axis) and the center axis of the tubular main rotary shaft or its extension (hereinafter referred to simply as Y-axis) may intersect at a right angle with each other at a point $t$ on said Y-axis. Within the tube of the tubular main rotary shaft 1 is loosely fitted an elongated shaft 12 so that a rear portion of said elongated shaft 12 may project from the rear end of the tubular main rotary shaft 1, said elongated shaft 12 having a variable bent arm 10 pivotably connected to its front portion via a pivot 11, which variable bent arm is in turn formed of a front tilting shaft 7 and a rear tilting shaft 8, each made of a steel material that is especially stiff against a bending force, and bendably connected to each other via a pivot 9. A U-shaped rotary arm 14 has a hole 15 in its bight portion in which is rotatably fitted and connected a thin shaft 13 at the tip end of the front tilting shaft 7 of the variable bent arm 10. By means of a retaining ring 16 on the shaft 13 said U-shaped rotary arm 14 is constrained to rotate about the center axis of the front tilting shaft or its extension (hereinafter referred to simply as Z-axis) serving as their common central axis. After the respective inside faces of the front portions of the opposite arms 17, 17 of said U-shaped rotary arm 14 have been preliminarily mated with the opposite side surfaces of the thick plate portion 4 of the blade shaft 5, said U-shaped rotary arm 14 is pivotably secured to the thick plate portion 4 via a pivot 18, in such manner that the distance from the pivot 11 to the pivot 9 may be equal to the distance from the pivot 9 to the point $t$, and that when the end of the elongated shaft 12 is coupled to an outside mechanism (a piloting system) and fixed in position as shown in FIG. 4 and the main rotary shaft 1 is rotated, the Z-axis may rock about the point $t$ where the X-axis and the Y-axis intersect at a right angle with each other, always along a plane (hereinafter referred to simply as rocking plane $j$) which rocks in coincidence with the rocking motion of the blade shaft 5 about its own axis. To the opposite end portions of the blade shaft 5 are fixedly secured hard base portions 22, 22 of wide blades $w, w'$ as shown in FIGS. 1 and 2. The blades are made of a stiff and light material, and each has an appropriate camber line in cross-section along an oblique line $f$-$f'$, to have a forwardly inclined surface 19 formed at its leading edge portion, a rearwardly inclined surface 20 formed at its trailing edge base portion, a flexible surface 21 formed at its trailing edge tip portion, and a small downward camber angle from the base portion towards the tip portion.

As shown in FIG. 4, the BIOPROP.R having the above-described structure has its tubular main rotary shaft 1 rotatably supported by bearing portions 24 at the tip ends of mounting arms 23. The shaft 1 is confined to rotation by means of retaining rings 25, 25. A bevel gear 26 on said tubular main rotary shaft 1 is meshed in a gear box $g$ with another bevel gear 29 at a tip end portion of a power transmission shaft 28 which is supported by a bearing frame 27 of the mounting arm 23. A periodic pitch control rod 30 provided at the rear end portion of the elongated shaft 12 can be operated in the axial direction $k$-$k'$ by means of an appropriate piloting system 31, 32 to impart to the Z-axis a tilt angle $\theta$ (for example, 30°) with respect to the Y-axis, and the periodic pitch control rod 30 can also be operated in the circumferential direction $k''$-$k'''$ about the Y-axis to adjust the azimuth of the variable bent arm 10 so as to direct its angle portion exactly downwards. A torque $m$ of a prime motor 33 is transmitted to the tubular main rotary shaft 1 through the power transmission shaft 28 and the gear box $g$ to rotate the BIOPROP.R in the direction of dotted arrows $r$. Thus the thick plate portion 4 of the blade shaft 5 rotates as it is directly subjected to a tilting interference by the upper tilting shaft 7 (Z-axis), so that the blades $w$, $w'$ at the opposite ends of the blade shaft are subjected to periodic pitch variation for each revolution.

Now the principle of the periodic pitch variation of the BIOPROP.R will be described analytically.

FIG. 6A is a representation of an operated state of the blade shaft 5 at the time point when its rotational azimuth is directed to the vertical line $x1$-$x'1$, while FIG. 6B is a representation of an operated state of the blade shaft 5 at the time point when its rotational azimuth is directed to the horizontal line $x4$-$x'4$. As shown in FIG. 6A, at the time point when the tilting interference (30°) with the rocking plane $j$ of the Z-axis is ineffective, the rocking plane $j$ is at a right angle to the rotary plane of the blade shaft 5, so that the pitches of the rectangular blades $w''$, $w'''$, each of which is mounted on the blade shaft 5 at a net angle $\alpha$ of 45° with respect to said rocking plane $j$, are both equal to 45°. However, as shown in FIG. 6B, at the time point when the tilting interference (30°) with the rocking plane $j$ of the Z-axis is effective to the largest extent, the rocking plane $j$ on the side of the horizontal line $x4$ is at 120° to the rotary plane of the blade shaft 5, so that the pitch of the rectangular blade $w''$, which is mounted on the blade shaft 5 at a net angle $\alpha$ of 45° with respect to said rocking plane $j$, is equal to 75°. At the same time the rocking plane $j$ on the side of the horizontal line $x'4$ is at 60° to the rotary plane of the blade shaft 5, so that the pitch of the rectangular blade $w'''$, which is mounted on the blade shaft 5 at a net angle $\alpha$ of 45° with respect to said rocking plane $j$, is equal to 15°.

FIGS. 7.1a to 7.6a are front views showing the periodic variation of the pitches of the rectangular blades $w''$ and $w'''$ corresponding to successive rotational azimuths at intervals of 30° of the BIOPROP.R, FIGS. 7.1b to 7.6b are left side perspective views of the respective states described above; FIGS. 7.1c to 7.6c are side views showing variation of the pitch of the rectangular blade $w''$ in FIGS. 7.1a to 7.6a, respectively, as viewed from the directions of $x1$ to $x6$, respectively, of the blade shaft 5. FIGS. 7.1d to 7.6d are side views showing variation of the pitch of the rectangular blade $w'''$ in FIGS. 7.1a to 7.6a, respectively, as viewed from the directions of $x'1$ to $x'6$, respectively of the blade shaft 5. In this connection, if the outer peripheral side or shorter edges (blade elements) of the rectangular blades $w''$ on the side of downward movement and those of the rectangular blades $w'''$ on the side of upward movement, from down to up represented in the respective left side perspective views of FIGS. 7.2b to 7.6b are, arrayed in vertical columns in the order of rotational sequence, then one obtains FIGS. 8A and 8B, respectively. As will be obvious from these figures, the mode of pitch variation of the blades $w''$, $w'''$ during the rotation of the BIOPROP.R is such that in the interval of motion on the side of the azimuth angle for the highest pitch, a high pitch of substantially constant value (75°) is maintained except for the upper and lower positions of motion, while in the interval of motion on the side of the azimuth angle for the lowest pitch, a low pitch of substantially constant value (15°) is maintained except for the upper and lower positions of motion, and that the variation of pitch is quickly achieved within small angular intervals at the opposite, top and bottom ends of the rotary plane. This is an important feature inherent to the BIOPROP.R only, which could not be realized by the pitch variation mechanisms for propellers in the prior art and even by the periodic pitch variation mechanisms for rotary blades in the prior art.

Now the basic aerodynamic effects of the abovedescribed BIOPROP.R during its high speed rotation will be described.

The respective figures in FIG. 9 illustrate the various states of the inversely proportional periodic pitch variations for the respective rectangular blades $w''$ and $w'''$ as well as the resulting changes in the aerodynamic effects due to variation of the tilt angle $\theta$ of the Z-axis with respect to the Y-axis at intervals of 10°, as viewed in perspective from the side of the horizontal line $x4$. Firstly, since the rectangular blade $w''$ on the downwardly moving side in FIG. 9B is moved down while maintaining a fixed high pitch (75°) according to the previously described characteristic mode of the periodic pitch variation, during this flap-down motion a negative pressure arises on the upper surface of the blade, while a positive pressure arises on the lower surface of the blade, and due to this pressure difference a thrust vector $p'$ directed in the obliquely upward and forward direction is generated. Analysing this thrust into its components in detail, it is an aerodynamic force composed of an intense upward suction force generated by the negative pressure on the upper surface of the blade, and a push-up force directed in the obliquely upward and forward direction that is generated as a reaction to the change in momentum when the air flow diverted by the positive pressure on the lower surface of the blade is given a slip stream speed directed in the obliquely downward and backward direction. However, since the direction of this thrust vector $p'$ is affected by the backward slip stream (represented by small arrows) generated by the blade $w'''$ on the upwardly moving side, the angle of deflection of the vector $p'$ will vary depending upon the degree of effect. More particularly, as shown in FIGS. 9A and 9B, where the tilt angle $\theta$ of the Z-axis with respect to the Y-axis is relatively large (75°–85°), since the slip stream $s$ is generated downwardly at a steep angle, and also since the pitch of the rectangular blade $w'''$ on the upwardly moving side is very small (5°–15°), resulting in a slight effect of its slip stream (represented by small arrows), the direction of the composite thrust vector $p$ generated by both the rectangular blades $w''$, $w'''$ on the upwardly moving and downwardly moving sides, respectively, is slightly tilted forwardly relative to the thrust vector $p'$ generated by the rectangular blade $w''$ on the downwardly moving side. On the other hand, as shown in FIGS. 9C and 9D, where the tilt angle $\theta$ of the Z-axis with respect to the Y-axis is relatively small (20°–10°), since the pitch of the rectangular blade $w''$ on the downwardly moving side is reduced to 65°–55° and the direction of its slip stream $s$ is tilted obliquely backwards and downwards, and also since the pitch of the rectangular blade $w'''$ on the upwardly moving side is increased to 25°–35° and thereby the effect of its slip stream (represented by small arrows) begins to intensify, the direction of the composite thrust vector $p$ generated by both the rectangular blades $w''$, $w'''$ on the flap-down and flap-up sides, respectively, is largely tilted forwardly relative to the thrust vector $p'$ generated by the rectangular blade $w''$ on the flap-down side. Further, as shown in FIG. 9E, in case the tilt angle $\theta$ of the Z-axis with respect to the Y-axis is zero, the tilting interference to the rocking plane $j$ of the Z-axis disappears at every azimuth of rotation, the both of the rectangular blades $w''$, $w'''$ on the flap-down and flap-up sides, respectively, take the state of a propeller of completely equal pitch, so that the composite thrust vector $p$ is directed substantially in the horizontal and forward direction. In other words, the subject BIOPROP.R can deflect its thrust axis (thrust vector $p$) substantially over the range of 90° while maintaining the attitude of its rotary plane fixed, through a simple adjustment of only the tilt angle $\theta$ of the Z-axis with respect to the Y-axis. This feature especially serves as a most basic factor for reasonably carrying out transition flight, in case the BIOPROP.R is utilized in a VTOL.

Next, description will be made of a BIOPROP.R' employing an alternative mechanism, which can achieve exactly the same periodic pitch variation as the above-described thrust axis deflection propeller R (BIOPROP.R).

FIGS. 10A, 10B and 10C1 show the structure of the aforementioned BIOPROP.R' as embodied in a two-blade mode. In these figures, a tubular main rotary shaft 1' extends through and is fixedly secured to a center of a base portion of a frame member 2', and at the upper portions of the respective arms 3', 3' are pivotably supported blade shafts 5', 5' having thick plate portions 4', 4' at their respective inner ends. By means of retaining rings 6', 6' the blade shafts are maintained precisely at such positions that the respective thick plate portions 4', 4' are located inside of the respective arms 3', 3' in an opposed relationship to each other. The center axes of the blade shafts and their extensions align on a straight line (hereinafter referred to simply as X-axis) and the center axis of the tubular main rotary shaft or its extension (hereinafter referred to simply as Y-axis) intersect at a right angle with each other at a point $t$ on said Y-axis. At the top of a tubular elongated shaft 12' that is loosely fitted within the tubular main rotary shaft 1' and that is somewhat longer than the tubular main rotary shaft 1', is fixedly secured a base portion of a guide member 8" having an arcuate band-shaped slide member 8' of inverse L-shaped cross-section inserted therein as shown in FIG. 10B. The center of curvature $t'$ of the arcuate band-shaped slide member 8' is located on the Y-axis. A pinion gear 35 is fixedly secured to the top of a thin shaft 34 which is loosely fitted within the tubular elongated shaft 12' and which is somewhat longer than said shaft 12'. The pinion gear 35 precisely meshes with a partial crown gear 36 on the inside surface of the arcuate band-shaped slide member 8' as shown in FIG. 10B, while at an end portion of said arcuate band-shaped slide member 8' is studded a tilting shaft 7' precisely at such position that the center axis of said tilting shaft (hereinafter referred to simply as Z-axis) passes through the center of curvature $t'$ of the arcuate band-shaped slide member 8'. Then, after the respective base end coupling portions 37, 37 of a pair of rotary arms 14', 14' (shown in FIG. 10C1) have been preliminarily coupled, coupling holes 15', 15' provided in the respective base end coupling portions 37, 37 are fitted to a top thin shaft 13' of the tilting shaft 7' and axially fixed by means of a retaining ring 16' so that the respective rotary arms 14', 14' can rotate about the Z-axis on, plane perpendicular to the Z-axis, that is, can rotate about the center of curvature $t'$ of the arcuate band-shaped slide member 8' serving as a common center of rotation. Further, the axial position of the tubular elongated shaft 12' within the tubular main rotary shaft 1' is precisely prescribed by retaining rings 16', 16' so that the center of curvature $t'$ of the arcuate band-shaped slide member 8', corresponding to the common center of rotation of the respective rotary arms 14', 14', coincides with the cross point $t$ between the X-axis and the Y-axis. The respective rotary arms 14', 14' and the respective base end thick plate portions 4', 4' of the corresponding blade shafts 5', 5' are pivotably coupled at pivots 18', 11', 18', 11' with linkages 14'', 14'' which are freely swingable about their pivots 9', 9' and can move in coincidence with the rocking motion of the blade shafts 5', 5' about their own axes (hereinafter referred to simply as rocking planes $j'$, $j'$). At the tip end portions of the respective blade shafts 5', 5', are fixedly secured hard base portions 22, 22 of blades $w$, $w'$ having the same structural conditions as those illustrated in FIGS. 1 and 2.

The BIOPROP.R' having the above-described structure is mounted to the mounting arm 23 in the same manner as the BIOPROP.R illustrated in FIG. 4. The adjustment of the tilt angle $\theta$ of the tilting shaft 7' (Z-axis), which affords periodic pitch variation to the BIOPROP.R', is effected by rotating the pinion gear 38 at the top end of the thin shaft 34 in FIG. 10B via any appropriate transmission device to give a circumferential motion about the center point $t'$ to the arcuate belt-shaped slide member 8' within the guide member 8''. Thus, by the intermediary of any appropriate piloting system, a predetermined tilt angle $\theta$ is given to the Z-axis, and simultaneously therewith a highest pitch azimuth control rod 30' is operated to present the angled azimuth of the Z-axis along a vertical plane. Then, if the BIOPROP.R' is rotated in the direction of dotted arrows $r$ in FIG. 10A, in accordance with the rotation of the blade shafts 5', 5' about the Y-axis, the respective rotary arms 14', 14' are rotated about the Z-axis by the intermediary of the linkages 4', 4', and thereupon during the rocking motions of the respective rotary arms 14', 14' with respect to the rotary plane of the blade shafts 5', 5', the cantilever swinging motions on the respective rocking planes $j$, $j$ about the fulcrum point $t$ are completely absorbed by the motions of extension and contraction of the linkages 14'', 14'' achieved on said rocking planes $j$, $j$, and thus only the rocking motions of said rocking planes $j$, $j$ are transmitted to the blades $w$, $w'$ directly and in parallel.

In other words, the respective BIOPROPs.R, R' are different from each other only in the tilting mechanism for the tilting shafts 7, 7' (Z-axis) which afford the periodic pitch variation and in the transmission mechanism of the tilting interference to the blade shafts 5, and 5', 5'. Accordingly, both BIOPROPs.R, R' achieve the same periodic pitch variation and thus produce the same aerodynamic effect. However, in case of the former BIOPROP.R, since the system is such that the tilting interference of the upper tilting shaft 7 (Z-axis) is transmitted to the center base portion of the blade shaft 5, it has a disadvantage in that only a single plane can be established as the rocking plane $j$ for receiving and transmitting the tilting interference of the upper tilting shaft 7 (Z-axis) and as a natural result the blades $w$, $w'$ can be mounted only at the tip ends of the blade shaft 5. On the other hand, in case of the latter BIOPROP.R', since the system is such that the tilting interference of the upper tilting shaft 7' (Z-axis) is transmitted to the blade shafts 5', 5' via the linkages 14'', 14'' individually for the respective rotary arms 14', 14', the rocking planes j, j for receiving and transmitting the tilting interference of the upper tilting shaft 7 (Z-axis) can be established independently for the respective blade shafts 5', 5'. Therefore, as shown in FIGS. 10C2, 10C3, 10E and 10F, a three-blade type or four-blade type or any other multi-blade type of BIOPROP.R' can be constructed by increasing the number of the blade shafts to three or more so that the respective X-axes may intersect at the same point (point t) on the Y-axis at equal angular intervals, for instance, along three equispaced radial lines or along four perpendicular radial lines, and by additionally providing, for each additional blade shaft 5', one arm 3' of the frame member 2', a linkage 14'' and a rotary arm 14'. If the number of blades is increased to three or more, then even at the time point when one of the blades is passing through the top or bottom azimuths in the rotary plane and the lift for that blade is just lost, the lift can be secured by another blade rotating on the flap-down side, and consequently there is an advantage that even in case of rotating at a specially low speed, a stabilized high lift can always be obtained. This feature is also useful for preventing minute vibrations from occurring during the slow periodic pitch variation immediately after starting.

While two types of BIOPROPs.R, R' which can be most effectively utilized in the subject aircraft L have been described above, since both achieve the same periodic pitch variation and result in the same aerodynamic effects as described above, the principles of the subject aircraft L that utilizes said BIOPROP.R, R' will be described in detail hereinunder only with respect to the former BIOPROP.R, for convenience of explanation.

FIGS. 11A, 11B and 11C are three views of the subject aircraft L equipped with tractor BIOPROPs.R, at the front portions of the respective outside edges of the main wings 40, in such manner that the distribution of the periodic pitch variations may be made symmetrically on the opposite sides of the aircraft axis. In these figures, both BIOPROPs.R, (R) are respectively coupled to a prime motor 33 within the aircraft body 39 via transmission shafts 28, and their respective periodic pitch control rods 30, are also coupled to a control stick through an appropriate control system. In addition, the BIOPROPs.R, are adjusted in such manner that the blades w, on the flap-down sides, on the respective outer sides of the respective rotary planes may have a higher pitch, while the blades w', (w') on the respective inner flap-up sides may have a lower pitch. Under the above-mentioned condition, if the respective BIOPROPs.R are synchronously rotated at a high speed, then on the respective outer sides of the respective rotary planes are obtained the same aerodynamic effects as those obtainable by the flap-down motion of living wings, while on the respective inner sides of the respective rotary plane are obtained the same aerodynamic effects as those obtainable by the flap-up motion of living wings, and also a pair of thrust axes are established on the opposite sides of the aircraft body 39, whereby the subject aircraft L can make flight on the basis of an aviation principle that is very similar to living wings.

More particularly, the position of the center of gravity of the subject aircraft L is established at the rear lower portion of the center of the main wings 40, (40) (Each main wing 40 is provided with a trailing edge flap 41.) so that when the hub portions of respective BIOPROPs.R are suspended, the angle of attack of the aircraft body 39 may become 15°–20°, and the landing attitude of the aircraft L is also adjusted by means of landing gears, (42) so that its attitude at the angle of attack may be maintained as shown in FIG. 12A. Therefore, in the state of said landing attitude, the rotary planes of the respective BIOPROPs.R take an attitude forwardly tilted at a steep angle of 75°–70° with respect to the horizontal axis. Now under this condition, the tilt angles $\theta$ of the respective upper tilting shafts 7 (Z-axis) of the BIOPROPs.R are respectively adjusted at 30° (See FIG. 9B), the pitch of the blades w, on the flap-down side being set at 75°, the pitch of the blades w', on the flap-up side being set at 15°, and the BIOPROPs.R are synchronously rotated at a high speed. Then the composite thrust vector p (thrust axis) generated by the respective blades w on the flap-down side and the respective blades w' on the flap-up side, in combination, will act substantially in the right upward direction with respect to the horizontal ground, and thereby the subject aircraft L immediately begins to rise vertically. Then, since the blades w, on the flap-down side which mainly produce the lift are broad in width and have a forward tilt angle with respect to the direction of motion and since the moving planes of said blades are also tilted forwardly, said blades w receive composite winds vo, each the resultant of a wind component moving in the right backward direction and a wind component moving in the right upward direction. These winds vo, move obliquely (at an angle of $\beta$) mainly being accelerated from the base portion leading edge of the blades w to the tip portion trailing edge thereof (See line f—f' in FIG. 1) under the influence of the large pneumatic pressure difference produced at the tip portion sides of the blades w, and having large momenta. These winds cause the tangent of the effective attack angle of the blades w with respect to the composite winds vo to be is reduced to a value equal to the tangent of the attack angle in the direction of the wing chord multiplied by $\cos \beta$. When they join together just behind the trailing edges of the blades w, they are converted into inwardly swirling vortexes at the obliquely rear and upper positions due to the pneumatic pressure difference between the upper and lower surface sides of the blades w, and thus the circulation of the air flows around the blades are greatly induced and promoted when these vortexes are produced. Accordingly, said blades w on the flap-down sides produce enormous aerodynamic forces (thrust vectors p') while being prevented from stalling despite their extremely high pitch, and thereby the high lift effect of the BIOPROPs.R upon take-off, accompanied with substantially no advancing speed, can be secured. This process of producing lift is, in principle, exactly the same as the lifting process by means of living wings.

As the composite thrust vectors p of the respective BIOPROPs.R are gradually tilted forwardly to reduce the tilt angles $\theta$ of the respective upper tilting shafts (Z-axis) of said BIOPROPs, horizontal thrust components will be produced in said composite thrust vectors p, and thereby, the subject aircraft L which has vertically risen in the above-described manner, will commence its low speed advance flight. The aviation principle of the subject aircraft L at this point of time and thereafter will be described hereinunder with reference to FIGS. 12B to 12E.

At first it is to be noted that the arrowed dotted line curves $r'$ represent running loci of the tip ends of the respective blades $w$, $w'$, in one rotational period of the BIOPROPs.R. Since said blades have a slight downward camber angle from their base portions towards their tip portions (See FIGS. 5A and 5B), the curvature of the running loci $r'$ on the flap-up side is larger than the curvature of the running loci on the flap-down side, and the respective blades would receive composite moving in the tangential directions of the respective curves having the larger and smaller curvatures upon each flap-up or flap-down operation.

More particularly, the aerodynamic force 1, produced at the blades $w$ on the flap-down side is generated on the basis of the substantial composite winds $vo''$, which have been compensated for the effect of reducing an effective attack angle of the blades with respect to the composite winds $vo$, that is brought about by the oblique motion of the composite winds flowing into said blades and for the acceleration effect of the air current. Accordingly, the aerodynamic forces 1 are exerted in the direction of the thrust vectors $p'$, composed of lifts $u'$, acting at a right angle to the substantial composite winds $vo''$, flowing into the blades and reactive forces $d$, acting in the direction of flows of the composite winds. These aerodynamic forces, produce vertical forces $h$ and advance forces $v$. In this case, since the reactive forces $d$, act in the obliquely backward and upward direction, the vertical component forces thereof are included in the respective vertical forces $h$, to thereby enhance the lifts of the respective BIOPROPs.R. In this connection, in case the blades on the flap-up side have such pitch as to be moving along the composite winds $vo'$, as shown in FIG. 12B, those blades ($w'$) can be flapped up almost without being subjected to aerodynamic resistances, and thus the aforementioned aerodynamic forces produced on the blades on the flap-down side are little affected thereby. However, in case the pitches of the blades on the flap-up side have negative attack angles with respect to the composite winds $vo'$, as shown in FIG. 12E1, the aerodynamic forces produced on these blades on the flap-up side will act in the direction of thrust vectors $p''$, directed obliquely backwards and upwards, and thus greatly increase the composite vertical forces (lifts) of the respective BIOPROPs.R, by generating vertical forces $h'$ at the sacrifice of a slight advance speed (generating backward forces $v'$). Therefore, if the backward forces acting upon the blades on the flap-up side are increased, they can be utilized for deceleration as an air brake. On the other hand, in case the pitches of the blades on the flap-up side have positive attack angles with respect to the composite winds $vo'$, as shown in FIG. 12E2, the aerodynamic forces $1''$ act in the direction of thrust vectors $p'''$, directed obliquely forwards and downwards, and thus generate advance forces $v''$, at the sacrifice of slight vertical forces (generating downward vertical forces $h''$). Accordingly, the advance speed can be further enhanced. Here it is to be noted that although the downward vertical forces $h''$ are generated, the high lift effect of the BIOPROPs.R is not deteriorated at all, because at the enhanced flight speed, the downward vertical forces generated on the blades on the flap-up side are almost offset by the increased effect of the upward vertical forces on the blades on the flap-down side in accordance with the enhancement of the flight speed.

In this way, when the subject aircraft L has attained the flying state as shown in FIG. 12C, elevators 43, and a vertical rudder 44, which have been preliminarily adjusted so as to maintain the flight attitude of the aircraft body 39 horizontally, begin to function, so that the aircraft body 39 takes a perfectly horizontal flight attitude as shown in FIG. 12D, and simultaneously therewith the thrust axis (the composite thrust vector $p$) of the respective BIOPROPs.R is also tilted forwardly, and thus the subject aircraft L begins a high speed cruising flight. Then, since the wing tip stall of the main wings 40 can be prevented by the down-wash effect of the blades on the respective flap-down sides of the respective BIOPROPs.R, these main wings can generate a high lift despite their smaller surface area, which greatly assists the high lift effect of the BIOPROPs.R at this point of time. Therefore, the lift performance of the subject aircraft L during its cruising flight is more favorable than any other aircraft as compared with respect to a load per unit power.

The process of landing of the subject aircraft L can be achieved by merely carrying out the aforementioned control operations in the reversed sequence, and if necessary, it is possible to make the aircraft quickly descend vertically by abruptly increasing the tilt angles $\theta$ of the respective upper tilting shafts 7 (Z-axis) of the respective BIOPROPs.R, to apply strong air brake effects upon the blades on the flap-up sides, thus decelerating the aircraft L.

While the subject aircraft L has been described above with respect to its utilization as a VTOL, if it is utilized as a STOL, which achieves take-off and landing with motion along the ground, then the lift enhancement effect of the respective BIOPROPs.R in accordance with the increase of the speed relative to the air and the high lift effect caused by the trailing edge flaps 41 of the main wings 40 will act cooperatively, and therefore this type of aircraft is a highly economical and practical aircraft that is more advantageous in pay load than any known STOL with respect to load per unit power.

It is to be noted that the attitude control about three axes of the subject aircraft L during its flight can be carried out by fully making use of the inversely proportional change of the periodic pitch variation, the change of the highest pitch azimuth, and the like of the respective BIOPROPs.R, to tilt the directions of the thrust axes (the composite thrust vectors $p$, $p$) on the respective sides of the aircraft body 39. Therefore, in case of hovering flight, the attitude as well as the motion of the aircraft body 39 are forcively controlled by the balancing of the oppositely acting component forces including the thrust vectors $p'$ produced on the blades on the respective flap-down sides of the respective BIOPROPs.R, and the thrust vectors $p''$ or $p'''$ produced on the blades on the respective flap-up sides. Accordingly, there exists an advantage that merely by slightly breaking the balanced condition between these component forces it is possible to transfer to another flight motion, and in other words, this means that the subject aircraft L has an excellent control capability in that any change in an air current generated during hovering flight or low speed flight can be dealt with quickly and appropriately. In addition, in case the subject aircraft L has an advance speed, the above-described excellent attitude control forces are greatly reinforced by the compression effect of the air current in accordance with the increase of the speed relative to the air, so that the flight attitude of the aircraft body 39 can be controlled quickly and appropriately by merely adjusting the respective BIOPROPs.R. In other words, this also means that the control capability of the subject aircraft L during advance flight is excellent.

While description has been made above with respect to the aviation principle of the subject aircraft L having the most basic construction, in which a pair of thrust axes (composite thrust vectors $p$) produced by a pair of BIOPROPs.R are respectively disposed at equivalent positions on the opposite sides of the aircraft axis, the aircraft according to the present invention can make flight according to the same aviation principle even if the phase of the symmetrical distribution of the periodic pitch variations of the pair of BIOPROPs.R on the opposite sides of the aircraft axis should be changed, so long as the deflected component forces opposite to each other on the respective sides of the aircraft axis are balanced to each other to such extent that the safety of the aircraft body 39 in the air can be secured. Therefore, by employing particular modes of distribution of the periodic pitch variations of a pair of BIOPROPs.R with respect to the aircraft axis, and by incorporating other auxiliary aerodynamic apparatus, various advantages in flight as described hereinunder will be further obtained in addition to the flight capability of the subject aircraft L having the basic structure.

In a modified embodiment illustrated in FIG. 13L1, a pair of BIOPROPs.R are equipped behind the main wings 40 in such manner that the blades on the flap-down sides may be located on the respective outer sides of the respective rotary planes, and that the planes of flap-down motion may be positioned just behind the trailing edge flaps 41 provided on the main wings 40, and the BIOPROPs and the trailing edge flaps are coupled to each other so that the degree of periodic pitch variation of the BIOPROPs.R, R and the degree of downward angle variation of the trailing edge flaps may be changed substantially in proportion to each other. In this case, during low speed flight, the wing slip stream diverted by the trailing edge flaps 41, which is given a large downward angle, is further accelerated downwardly at a steep angle by the slip stream directed obliquely backwards and downwards that is produced by the blades on the flap-down side having a higher pitch, and also it greatly accelerates by induction the air current speed on the upper surface side of the main wings. Owing to both of these effects, a considerably high lift effect may be obtained even in case of a low advance velocity of the main wings and thus the high lift effect of the BIOPROPs.R during low speed flight can be extremely enhanced. Therefore, this embodiment is suitable for a VSTOL.

In another modified embodiment illustrated in FIG. 13L2, a pair of BIOPROPs.R are installed behind the main wings 40 in such manner that the blades on the flap-down sides may be located on the respective inner sides of the respective rotary planes, and that the planes of flap-down motion may be positioned just behind the trailing edge flaps 41, provided on the main wings 40, and the BIOPROPs and the trailing edge flaps are coupled to each other so that the degree of the periodic pitch variation of the BIOPROPs.R and the degree of the downward angle variation of the trailing edge flaps may be changed substantially in proportion to each other. In this case also, for the same reasons as in the case of the aforementioned embodiment in FIG. 12L1, a substantial high lift effect can act upon the main wings 40 during low speed flight. Furthermore, with respect to the BIOPROPs.R, when a pair of obliquely backward and downward slip streams on the respective inner sides, which are produced by the blades on the higher pitch flap-down sides, join together beneath the aircraft body 39, they are greatly accelerated while attaining induced speeds, and simultaneously therewith, an upward force (lift component), acting as a reactive force corresponding to the momentum change upon this acceleration, is substantially increased. Accordingly, the rising force upon low speed flight that is generated as a composite result, combined with the high lift effect produced on the main wings, becomes larger than any other type of embodiment. Therefore, this mode of embodiment is also desirable for a VSTOL.

Further, in another modification illustrated in FIG. 13L3, a pair of BIOPROPs.R are respectively equipped at the front and rear ends of the aircraft body 39 and thus the thrust axes are longitudinally arrayed along the aircraft axis. In this case, the opposite deflected component forces of the respective thrust axes are offset by each other at the front and rear ends of the aircraft axis, so that an excellent flight directivity can be reailized, and also owing to the balancing of the oppositely deflected component forces acting at the front and rear ends of the aircraft, a lateral stability as well as a longitudinal stability of the aircraft body 39 can be secured.

In a still further modification illustrated in FIG. 13L4, the pair of BIOPROPs.R, equipped to the basic type of subject aircraft L, are doubly equipped to the front and rear portions, respectively, of the aircraft body 39 by the intermediary of four main wing 40. In this case, reinforced lateral stability is secured by the balancing of the opposite forces of wind pressure which are produced by a pair of blades on the flap-down sides, positioned on the very long moment arms on the respective sides of the aircraft axis and equally realized at the front and rear portions of the aircraft body, hence an extremely excellent longitudinal stability results on each side of the aircraft axis, and thus the safety of the aircraft body 39 in the air can be greatly improved by the joint effects of these lateral and longitudinal stabilities.

In another modification illustrated in FIG. 13L5, the pair of BIOPROPs.R, are doubly equipped to the aircraft body 39, one pair being at the rear portion according to the mode of embodiment in FIG. 12L1, while the other pair is at the front portion according to the mode of embodiment in FIG. 12L2. In this case, since the high lift effects inherent in the above-described respective modes of embodiment act upon the front and rear portions, respectively, of the aircraft body 39, this combined embodiment is suitable for a VSTOL similarly to said previous modes of embodiment. In addition, in this embodiment, the relationship of the pair of front and rear BIOPROPs.R, on each side of the aircraft axis is the same as that of the embodiment in FIG. 12L3 and thus a lateral stability as well as a longitudinal stability can be secured on the respective sides of the aircraft, hence the safety in the air of this embodiment is most excellent among the abovedescribed various modes of embodiment. Therefore, this embodiment is favorable for any type of use among VTOL, VSTOL and STOL.

In the above-described aircraft body construction according to the present invention, if the BIOPROPs.R, are small-sized, and also if the aircraft body is constructed in an airship form, with a floating gas bladder, then the high lift effect produced by the BIOPROPs.R greatly assists the buoyancy of the aircraft body and consequently, the volume of the gas bladder section can be much reduced, to such extent that it may serve as a parachute when the prime motor is damaged. Thus this construction brings about an advantage that the aerodynamic resistance of the aircraft body (including the floating gas bladder) can be greatly reduced, and also it widely enhances speed, mobility and economy, which have been rather low in the case of conventional airships. However, this airship form of aircraft body belongs, strictly, to the field of V/STOL aircraft rather than the field of airships, because in principle, it is operated under a state where it is heavier than air.

What is claimed is:

1. A propeller rotatable about a substantially longitudinal and normally horizontal thrust axis in an airborne vehicle, for imparting to the vehicle both lifting force and thrust in one direction along said axis, said propeller having a plurality of blades, each of which is elongated radially to said thrust axis and continuously so varies its pitch angle relative to said axis, in the course of a propeller revolution, as to be disposed at a substantially high pitch in the downwardly moving portion of its orbit and at a substantially low pitch in the upwardly moving portion of its orbit, said propeller comprising:

A. a frame having
 1. a base portion which extends across said thrust axis and which is connectable with drive means for imparting rotation to the propeller, and
 2. blade supporting portions, one for each blade, fixed to said base portion and extending therefrom in one direction parallel to said thrust axis, said blade supporting portions being radially spaced from said thrust axis;
B. a shaft element for each blade, each of said shaft elements extending through the blade supporting portion for its blade to have an inner end within the frame and to have an outer end anchored to a radially inner portion of its blade, the axes of all of said shaft elements being perpendicular to said thrust axis and intersecting the same at one point, and each of said shaft elements being confined to rotation about its axis in opposite directions relative to the frame, for increase and decrease of the pitch of its blade, and being thus constrained to move bodily with rotation of the frame;
C. a first pitch control member fixable relative to the vehicle in a position spaced vertically to one side of the thrust axis;
D. a second pitch control member between said blade supporting portions of the frame;
E. means providing a connection between the first and second pitch control members whereby the second pitch control member is rotatable relative to the first pitch control member about a rotation axis which is oblique to the thrust axis and which passes through said point and through at least a portion of the first pitch control member; and
F. means providing a swivel connection between the second pitch control member and each of the shaft elements, whereby the second pitch control member is confined to motion relative to the shaft elements in opposite directions about a swiveling axis which extends through said point and which is perpendicular to each of the rotation axis and the shaft element axes, the last mentioned means constraining the second pitch control member and said shaft elements to rotate in unison, relative to the frame, about the axes of the shaft elements.

2. The propeller of claim 1, wherein said frame further comprises a tubular portion concentric to the thrust axis, fixed to the base portion and projecting therefrom in the other direction parallel to the thrust axis, for connection to power means by which the propeller is rotatably driven, further characterized by G. means for supporting the first pitch control member at said position, comprising
 1. a pitch control shaft extending through said tubular portion and projecting through said base portion to have an inner end portion disposed between said blade supporting portions of the frame, and
 2. an arm having one end connected with said inner end portion of the pitch control shaft, extending obliquely away from the thrust axis in said one direction parallel thereto, and having its other end connected with the first pitch control member.

3. The propeller of claim 2 wherein said pitch control shaft is axially movable relative to the tubular portion of the frame, for adjustment of the relative pitches of the blades in the respective upwardly and downwardly moving portions of their orbits, and wherein said arm comprises a link having pivotal connections to the pitch control shaft and to the first pitch control member, respectively, the axes of said pivotal connections being parallel to one another and transverse to the thrust axis.

* * * * *